(12) United States Patent
Okamoto et al.

(10) Patent No.: US 10,011,294 B2
(45) Date of Patent: Jul. 3, 2018

(54) ELECTRIC POWER STEERING APPARATUS

(71) Applicants: HITACHI AUTOMOTIVE SYSTEMS, LTD., Hitachinaka-shi, Ibaraki (JP); SUBARU CORPORATION, Tokyo (JP)

(72) Inventors: Hirokazu Okamoto, Atsugi (JP); Yusuke Fukuda, Atsugi (JP); Hiroyuki Oiwa, Ota (JP); Mitsuharu Minami, Ota (JP)

(73) Assignees: HITACHI AUTOMOTIVE SYSTEMS, LTD., Hitachinaka-Shi (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/556,611

(22) PCT Filed: Mar. 17, 2016

(86) PCT No.: PCT/JP2016/058421
§ 371 (c)(1),
(2) Date: Sep. 7, 2017

(87) PCT Pub. No.: WO2016/152694
PCT Pub. Date: Sep. 29, 2016

(65) Prior Publication Data
US 2018/0043924 A1 Feb. 15, 2018

(30) Foreign Application Priority Data
Mar. 26, 2015 (JP) .................... 2015-064284

(51) Int. Cl.
*B62D 5/04* (2006.01)
*B62D 3/12* (2006.01)
*F16H 1/16* (2006.01)

(52) U.S. Cl.
CPC ........... *B62D 3/123* (2013.01); *B62D 5/0421* (2013.01); *B62D 5/0463* (2013.01); *F16H 1/16* (2013.01)

(58) Field of Classification Search
CPC .... B62D 3/123; B62D 5/0463; B62D 5/0421; F16H 1/16
See application file for complete search history.

(56) References Cited

U.S. PATENT DOCUMENTS 5,718,149 A * 2/1998 Phillips ................. B62D 3/123
74/422
5,957,027 A * 9/1999 Gilbert ................... B62D 5/083
137/625.23

(Continued)

FOREIGN PATENT DOCUMENTS

JP 2011-079430 A 4/2011
JP 2012-218512 A 11/2012

(Continued)

*Primary Examiner* — Tony H Winner
*Assistant Examiner* — Michael R Stabley
(74) *Attorney, Agent, or Firm* — Foley & Lardner LLP

(57) ABSTRACT

An electric power steering apparatus according to the present invention has a biasing member arranged to bias a rack retainer toward a rack bar, wherein a biasing force of the biasing member is set such that, in a two-axis coordinate system with a rotation amount of a steering wheel on a horizontal axis and a steering torque on a vertical axis, the steering torque increases with increase in the rotation amount of the steering wheel in a region before the start of relative movement of the rack bar and the rack retainer.

14 Claims, 8 Drawing Sheets

(56) References Cited

U.S. PATENT DOCUMENTS

| | | | | |
|---|---|---|---|---|
| 6,079,289 A * | 6/2000 | Gilbert | ................... | B62D 5/083 |
| | | | | 137/625.21 |
| 6,543,570 B2 * | 4/2003 | Parker | .................. | B62D 5/0463 |
| | | | | 180/446 |
| 6,595,532 B2 * | 7/2003 | Tanaka | .................. | B62D 3/123 |
| | | | | 280/93.515 |
| 6,749,040 B1 * | 6/2004 | Menjak | .................. | B62D 3/123 |
| | | | | 180/443 |
| 7,281,444 B1 * | 10/2007 | Bishop | .................. | B62D 3/123 |
| | | | | 74/388 PS |
| 7,841,443 B2 * | 11/2010 | Mizuno | .................. | B62D 3/123 |
| | | | | 180/443 |
| 8,245,813 B2 * | 8/2012 | Mizuno | .................. | B62D 3/123 |
| | | | | 180/444 |
| 8,443,689 B2 * | 5/2013 | Kawakubo | ............. | B62D 3/123 |
| | | | | 74/422 |
| 2015/0226315 A1 * | 8/2015 | Iizuka | ................... | B62D 3/126 |
| | | | | 74/409 |
| 2015/0266506 A1 * | 9/2015 | Sato | ..................... | B62D 5/0421 |
| | | | | 180/444 |

FOREIGN PATENT DOCUMENTS

| | | |
|---|---|---|
| JP | 2015-107683 A | 6/2015 |
| JP | 2015-168326 A | 9/2015 |

\* cited by examiner (a)

(b)

ELECTRIC POWER STEERING APPARATUS

FIELD OF THE INVENTION

The present invention relates to an electric power steering apparatus.

BACKGROUND ART

There is conventionally known a rack-and-pinion steering device in which a rack retainer is provided to bias a rack bar toward a pinion shaft.

PRIOR ART DOCUMENTS

Patent Document

Patent Document 1: Japanese Laid-Open Patent Publication No. 2012-218512

SUMMARY OF THE INVENTION

Problem to Be Solved by the Invention

In Patent Document 1, however, the set load of the rack retainer is high so that the steering device has the problem of difficulty in smooth operation at the start of movement of the rack bar. The problem arises as follows. At the time when the rack bar actually starts moving with increase in the rotation amount of a steering wheel, the steering torque exerted before the start of movement of the rack bar becomes larger than the steering torque required after the start of movement of the rack bar. After that, the rack bar starts moving while the steering torque decreases to that required after the start of movement of the rack bar. This results in failure to improve steering feeling.

It is an object of the present invention to provide an electric power steering apparatus capable of improving steering feeling.

Means for Solving the Problems

In order to achieve the above object, an electric power steering apparatus according to the present invention comprises a biasing member arranged to bias a rack retainer toward a rack bar such that, in a two-dimensional coordinate system in which: a horizontal axis represents a rotation amount of a steering wheel; a vertical axis represents a steering torque; a region where a torsion amount of a torsion bar increases in response to rotation of the steering wheel without causing rotation of a pinion and axial movement of the rack bar is assumed as a first region; a gradient of increase of the steering torque relative to the rotation amount of the steering wheel in the first region is assumed as a gradient L1; a region where the rack retainer swings in response to rotation of the steering wheel to thereby cause axial movement of the rack bar without sliding of the rack retainer and the rack bar is assumed as a second region; a region where there occurs axial movement of the rack bar, with sliding of the rack retainer and the rack bar, in response to rotation of the steering wheel is assumed as a third region; a gradient of increase of the steering torque relative to the rotation amount of the steering wheel in the third region is assumed as a gradient L2; a boundary between the first and second regions is assumed as a boundary point a; a boundary between the second and third regions is assumed as a boundary point b; and an intersection of a first imaginary line drawn along the gradient L1 from the boundary point a to an area where the rotation amount of the steering wheel is larger than at the boundary point a and a second imaginary line drawn along the gradient L2 from the boundary point b to an area where the rotation amount of the steering wheel is smaller than at the boundary point b is assumed as a boundary point c, the boundary point a lies in a range where the rotation amount of the steering wheel and the steering torque are smaller than those at the boundary point c, and the boundary point b lies in a range where the rotation amount of the steering wheel is larger than that at the boundary point c.

Effects of the Invention

As the set load of the biasing member is adjusted smaller such that the boundary point a lies in the smaller steering angle range, it is possible to ensure smooth movement of the steering wheel at the start of steering operation. Further, it is possible to obtain smoothly-curved steering angle/steering torque characteristics as the biasing member is set such that the boundary point b lies in the larger steering angle range than at the boundary point c. The electric power steering apparatus is therefore able to achieve improved steering feeling.

DESCRIPTION OF EMBODIMENTS

First Embodiment

Figure 1:
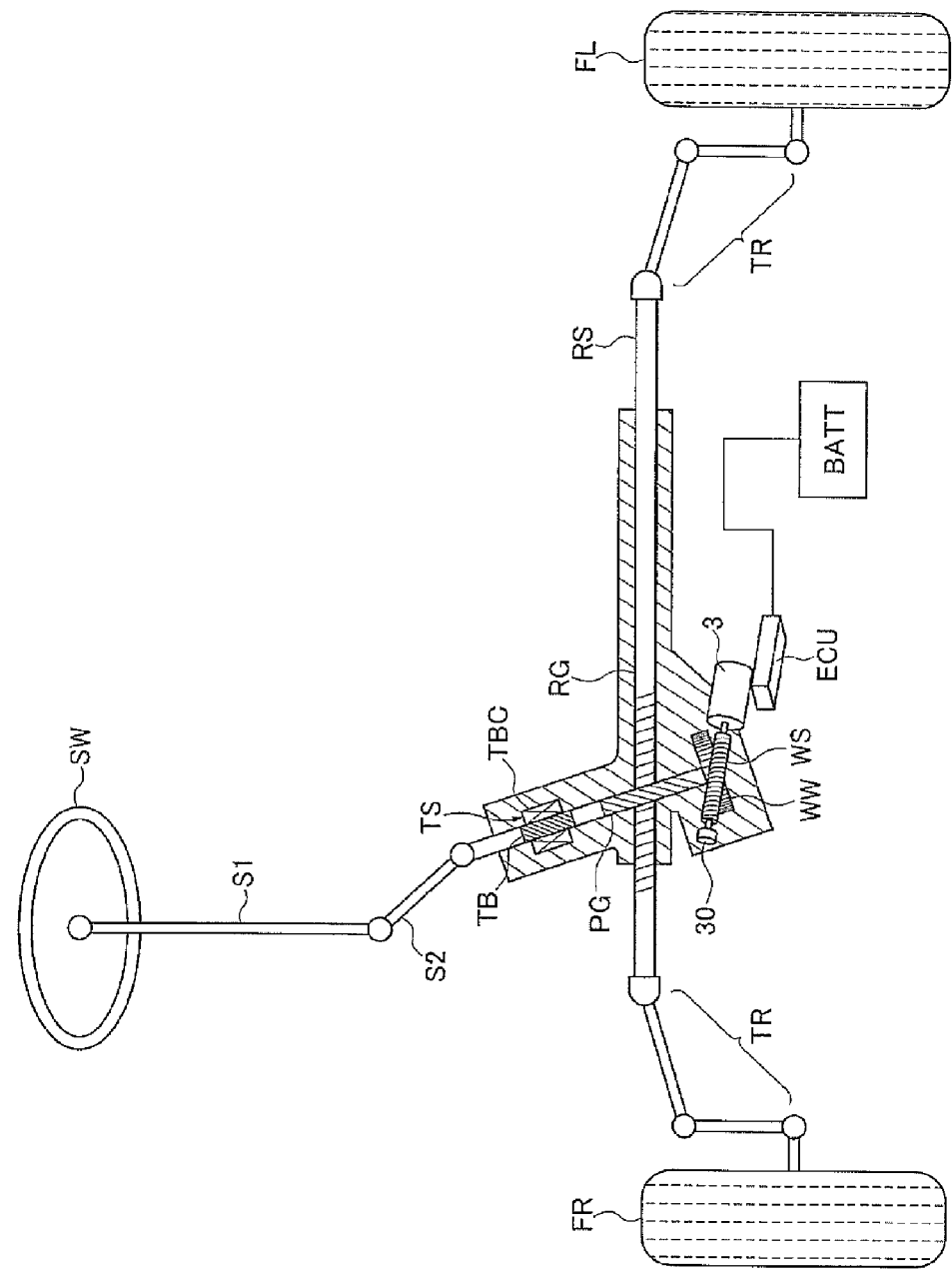
FIG. 1 is a schematic view of an electric power steering apparatus according to a first embodiment of the present invention.

FIG. 1 is a schematic view of an electric power steering apparatus according to a first embodiment of the present invention. In the first embodiment, the electric power steering apparatus EPS includes a steering unit, a reduction gear unit, an electric motor 3 and a backlash adjustment mechanism 30. The steering unit has a steering shaft assembly including a steering shaft S1 coupled to a steering wheel SW, an intermediate shaft S2 coupled to the steering shaft S1 via a universal joint, a pinion shaft PS coupled to the intermediate shaft S2 via a universal joint. A pinion PG provided on a distal end portion of the pinion shaft PS is in engagement with rack teeth RG formed on a rack bar RB, thereby constituting a rack-and-pinion mechanism. The steering shaft assembly and the rack-and-pinion mechanism serve together as the steering unit. A torque sensor TS is arranged on the pinion shaft PS to detect a torque exerted between the steering wheel SW and the pinion PG Herein, the torque sensor TS has a torsion detection coil TBC and a torsion bar TB. The torsion bar TB is disposed on the pinion shaft PS so as to be twisted according to the torque between the steering wheel SW and the pinion PG The torsion detection coil TBC is disposed on an outer circumferential side of the torsion bar TB at a position closer to the steering wheel SW than the rack bar RB. Thus, the torque sensor TS determines the driver's steering torque based on a torsion amount of the torsion bar T detected by the torsion detection coil TBC and a spring constant of the torsion bar TB. When the pinion PB rotates in response to rotation of the steering wheel SW, the rack bar RB moves laterally so as to turn steerable wheels FR and FL through link mechanisms TR.

The reduction gear unit is arranged on the pinion shaft PS to transmit a rotational force of the electric motor 3 to the steering unit. Herein, the electric power steering apparatus is configured as a so-called single pinion-assist type power steering apparatus in the first embodiment. The electric motor 3 is arranged on a side of the pinion shaft PS opposite from the steering wheel SW (hereinafter referred to as a distal end side of the pinion shaft PS). The electric motor 3 is driven under the control of a controller ECU and is supplied with power from a battery BATT. Thus, the electric motor 3 outputs an assist torque according to the steering torque detected by the torque sensor TS when a rotation amount of the steering wheel SW becomes larger than or equal to a predetermined rotation amount.

Figure 2:
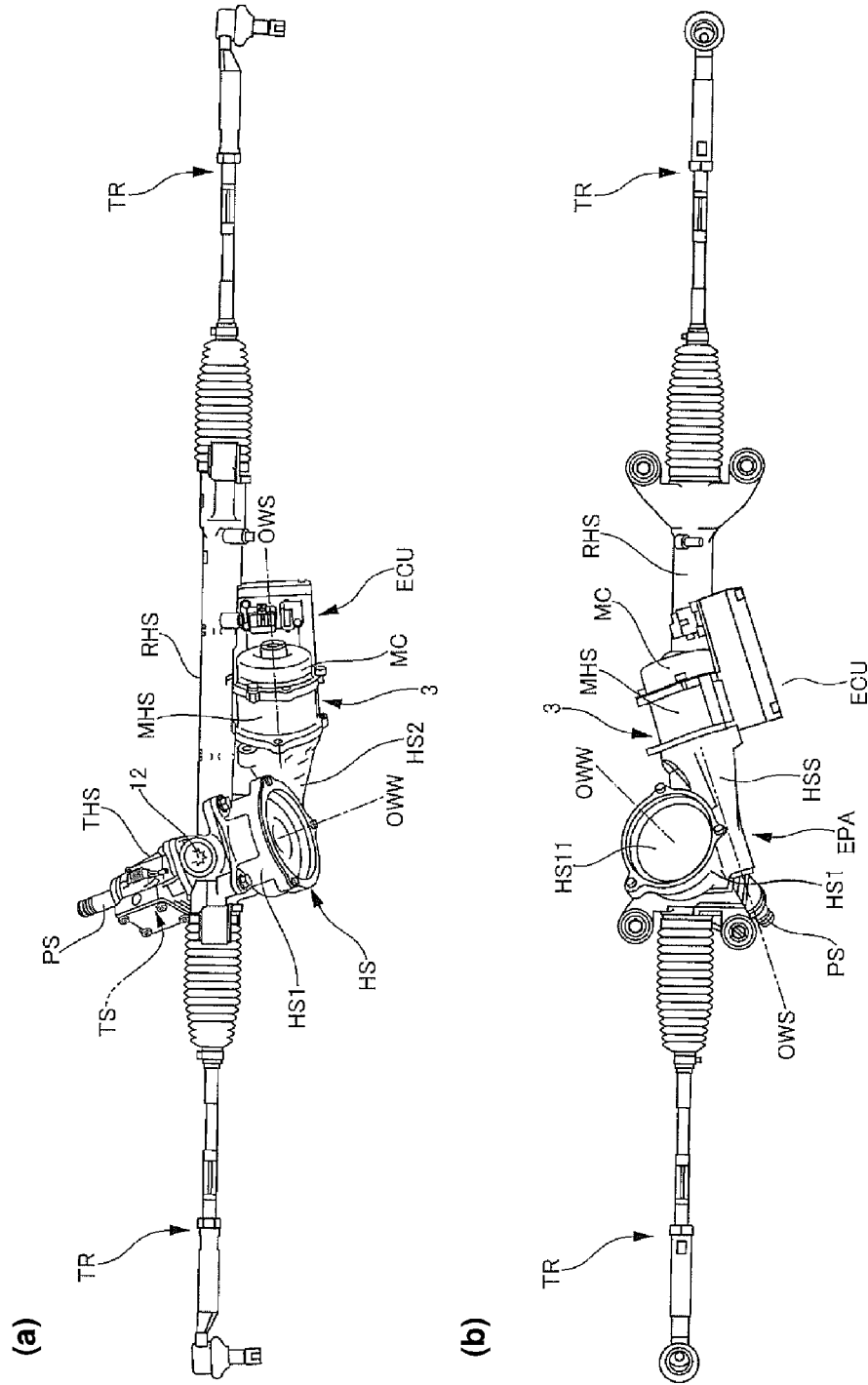
FIG. 2 is an external view of the electric power steering apparatus according to the first embodiment of the present invention.

FIG. 2 is an external view of the electric power steering apparatus in the first embodiment, in which: FIG. 2(*a*) shows a front view of the electric power steering apparatus as viewed from the front side of a vehicle; and FIG. 2(*b*) shows a bottom view of the electric power steering apparatus as viewed from the bottom side of the vehicle. The electric power steering apparatus EPS further includes a torque sensor housing THS that accommodates therein the torque sensor TS, a gear housing HS that accommodates therein the reduction gear unit, a motor housing MHS that accommodates therein the electric motor 3, a motor cover MC that closes the motor housing MHS, and a rack housing RHS that accommodates therein the pinion PG and the rack bar RB. The gear housing HS has a wheel accommodating part HS1 that accommodates a worm wheel WW and a shaft accommodating part HS2 that accommodates a worm shaft WS.

The worm wheel WW is made of a resin material and mounted to the pinion shaft PS. The worm shaft WS is made of a metal material and coupled to the electric motor 3. The worm wheel WW and the worm shaft WS are in engagement with each other, thereby constituting a worm gear WG as the reduction gear unit. Assuming a rotation axis of the worm wheel WW as a wheel axis OWW and a rotation axis of the worm shaft WS as a shaft axis OWS, the shaft axis OWS intersects the wheel axis OWW in a state of being inclined relative to a plane orthogonal to the wheel axis OWW. The torque outputted from the electric motor 3 is transmitted from the worm shaft WS to the worm wheel WW and then applied as the assist torque to the pinion shaft PS. Further, the worm wheel WW transmits a torque and rotation from the pinion shaft PS to the worm shaft WS; and the worm shaft WS transmits a torque and rotation from the worm shaft WW to the electric motor 3.

Figure 3:
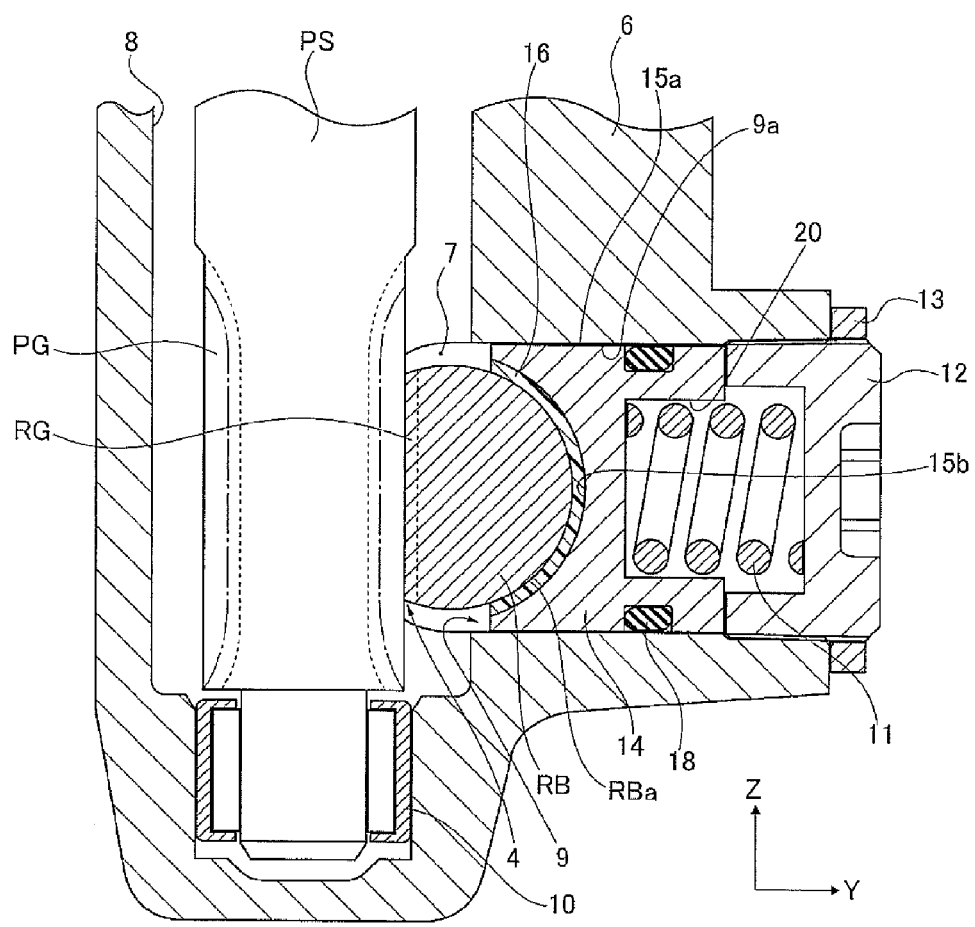
FIG. 3 is an enlarged cross-sectional view of a rack-and-pinion mechanism and its surroundings shown in FIG. 1.

FIG. 3 is an enlarged cross-sectional view of the rack-and-pinion mechanism and its surroundings shown in FIG. 1. Herein, a direction in which the rack bar RB and the pinion shaft PS move closer to or away from each other is defined as a y-axis direction; a direction parallel to the pinion shaft PS (i.e. a vertical direction) is defined as a z-axis direction; and a direction perpendicular to the y-axis direction and the z-axis direction (i.e. a direction perpendicular to the paper surface) is defined as an x-axis direction. The pinion PG provided on the distal end portion of the pinion shaft PS and the rack bar RB are accommodated within the rack housing RHS. The rack housing RHS includes: a rack bar accommodating part 7 formed along the x-axis direction such that the rack bar RB is axially movably accommodated in the rack bar accommodating part 7; a substantially cylindrical pinion accommodating part 8 formed along the z-axis direction so as to face the front side of the rack bar RB, while intersecting the rack bar accommodating part 7, such that the pinion shaft PS is rotatably accommodated in the pinion accommodating part 8; and a rack retainer accommodating part 9 formed along the y-axis from the rack bar accommodating part 7 toward the back side of the rack bar RB so as to face the back side of the rack bar RB. The distal end of the pinion shaft PS is rotatably supported by a bearing 10.

The electric power steering apparatus also includes a rack retainer 14 and a coil spring 11 accommodated in the rack retainer accommodating part 9. The rack retainer 14 is fitted in an inner wall 9*a* of the rack retainer accommodating part so as to retain a circular arc cross-section back-side protruding sliding surface RBa of the rack bar RB. The coil spring 11 is arranged as a biasing member to bias the rack bar RB toward the pinion shaft PS through the rack retainer 14. A bottomed cylindrical-shaped cap 12, on which one end of the coil spring 11 is seated, is screwed into an open end of the rack retainer accommodating part 9 opposite from the rack bar accommodating part 7. The cap 12 is fixed with a lock nut 13 after the biasing force of the coil spring 12 has been adjusted by back-and-forth movement of the cap 12. The rack retainer 14 is accommodated within the rack retainer accommodating part 9, with a slight radial clearance left therebetween, so as to be slidable along the y-axis direction.

Figure 4:
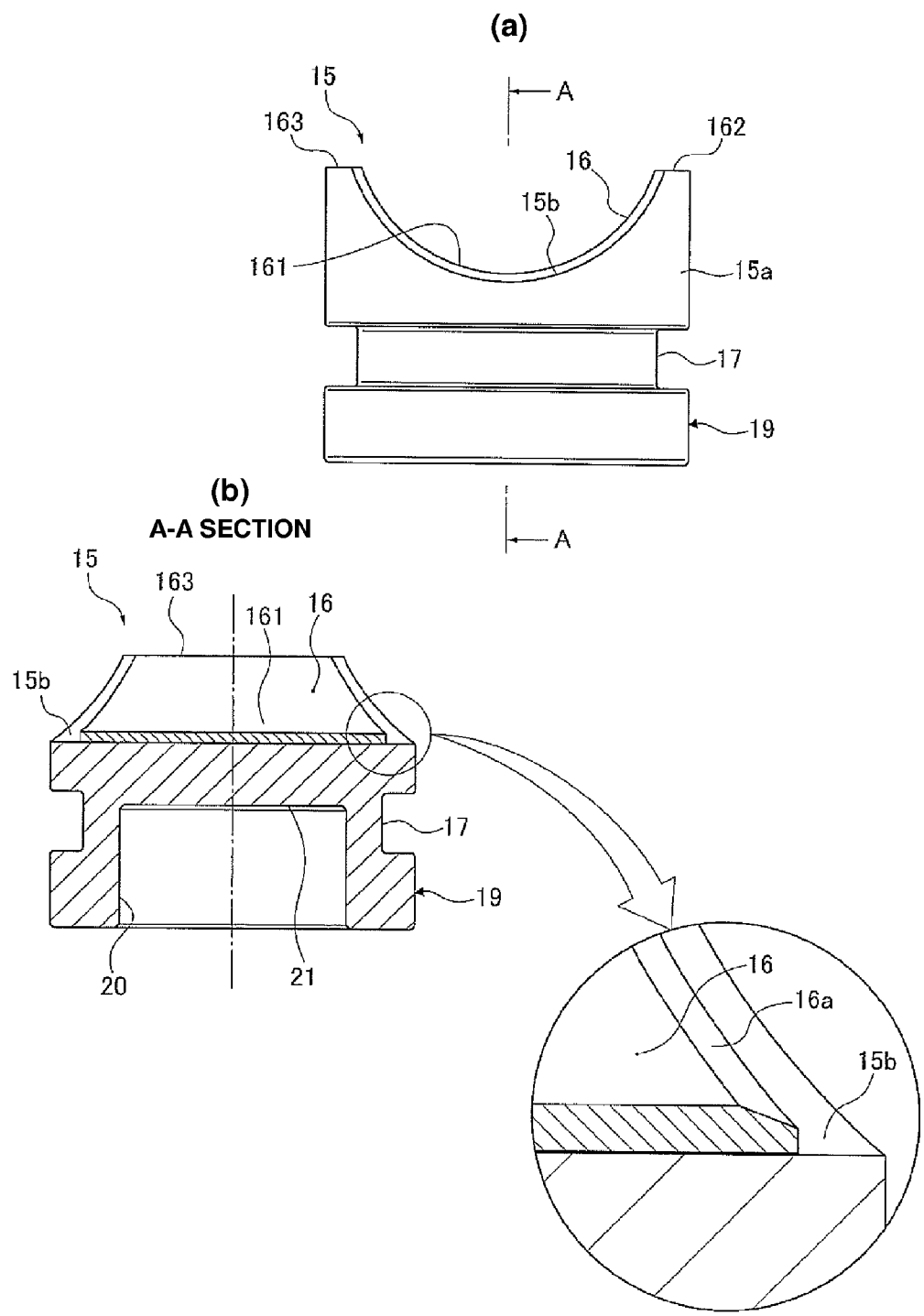
FIG. 4 is a schematic view of a rack retainer body of the electric power steering apparatus according to the first embodiment of the present invention.

FIG. 4 is a schematic view of the rack retainer body in the first embodiment, in which FIG. 4(*a*) shows a side view of the rack retainer body as viewed from the x-axis direction; and FIG. 4(*b*) shows a cross-sectional view of the rack retainer body taken along line A-A. The rack retainer 14 includes: a retainer body part 15 having a substantially circular outer shape when viewed in cross section perpendicular to the biasing direction of the coil spring 11; a retainer seat 16 located closer to the rack bar RB than the retainer body part 15 as a rack bar contact part for contact with the rack bar RB; a biasing member accommodating recess 20 (see FIG. 4(*b*)) opening at a side of the retainer body part opposite from the retainer seat 16; an annular seal ring groove 17 formed in an outer circumferential surface of the retainer body part 15 and having a substantially circular annular shape when viewed in cross section perpendicular to the biasing direction of the coil spring 11; and an O-ring 18 made of an elastic material and arranged in the seal ring groove 17 to support the rack retainer 14 swingably in a longitudinal direction of the rack bar RB within the rack retainer accommodating part 9. In the first embodiment, a single O-ring 18 is provided on the rack retainer 14.

The biasing member accommodating recess 20 is formed such that a bottom 21 of the biasing member accommodating recess 20 overlaps the seal ring groove 17 in the biasing direction of the coil spring 11. In other words, the seal ring groove 17, that is, the center of swing of the rack retainer 14 on the O-ring 18, and the bottom 21 of the biasing member accommodating recess 20, that is, the center of swing of the rack retainer 14 on the tip end of the coil spring 11 are arranged to overlap each other in the biasing direction of the coil spring. In this arrangement, increase of the set load of the spring coil 11 relative to inclination of the rack retainer 14 is suppressed so as to allow smooth swing of the rack retainer 14 (see FIG. 7).

The retainer seat 16 includes: a support surface 161 formed on a rack bar-side end portion of the retainer body part 15 and having a circular arc shape so as to extend along an outer circumferential surface of the rack bar RB; a pair of protruding portions, i.e. a first protruding portion 162 having its circumferential width gradually decreasing toward one circumferential end of the support surface 161 and a second protruding portion 163 having its circumferential width gradually decreasing toward the other circumferential end of the support surface 161; and a chamfered portion 16a provided on an edge portion of the support surface 161 for contact with the rack bar RB.

Figure 5:
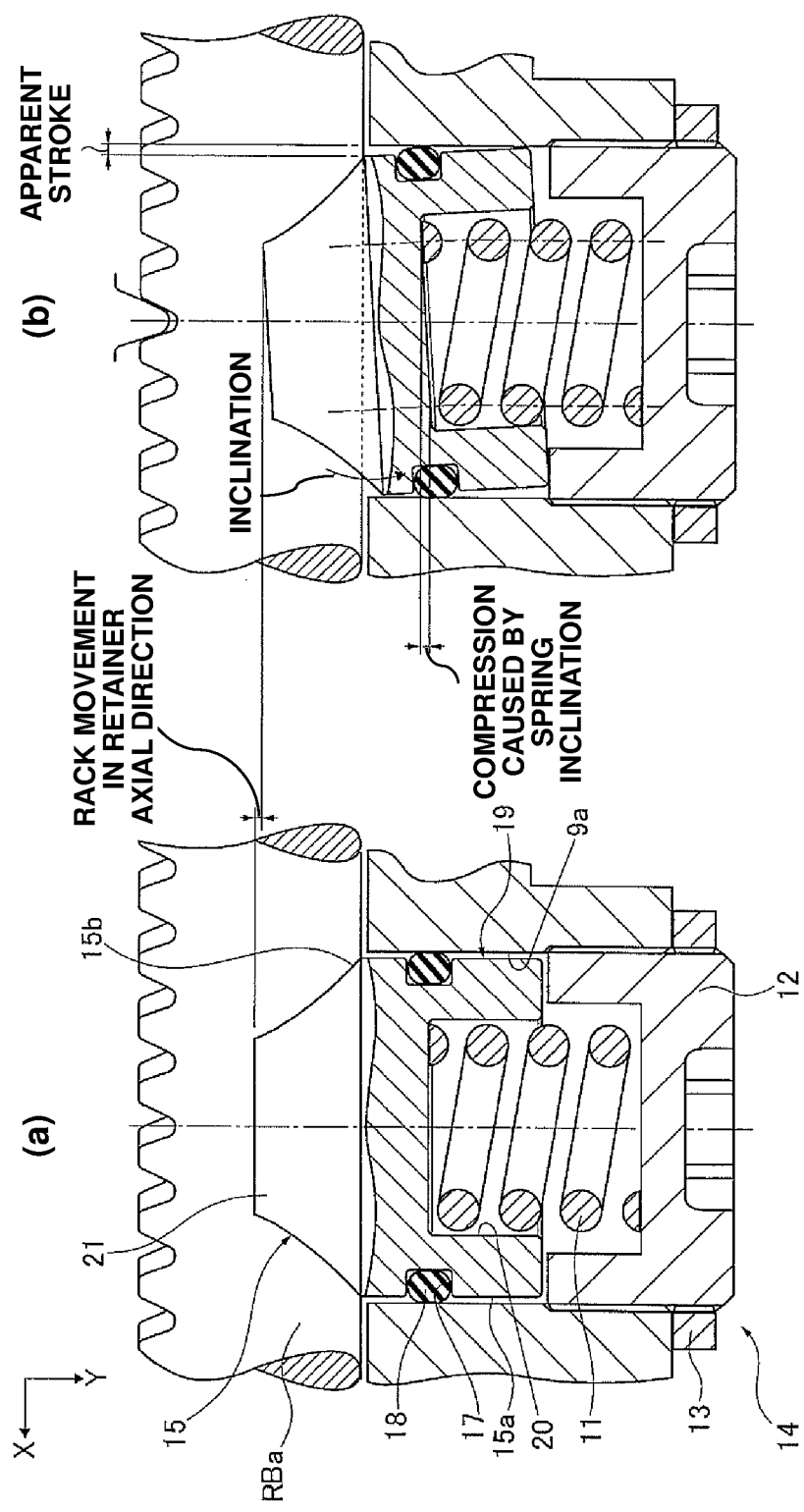
FIG. 5 is a schematic view showing operating actions of the rack-and-pinion mechanism and its surroundings of the electric power steering apparatus according to the first embodiment of the present invention.

The operating actions of the first embodiment will be explained below. FIG. 5 is a schematic view showing the operating actions of the rack-and-pinion mechanism and its surroundings in the first embodiment, in which FIG. 5(a) shows a state of the rack-and-pinion mechanism and its surroundings before the start of steering; and FIG. 5(b) shows a state of the rack-and-pinion mechanism and its surroundings after the start of steering. Before the start of steering, the rack retainer 14 is positioned in substantially the center of the rack retainer accommodating part 9 under the elastic force of the O-ring 18 to push the rack bar RB by the action of the coil spring 11 as shown in FIG. 5(a). In such a state, the driver starts steering the steering wheel SW. Then, the torsion bar TB is twisted; and the torque is transmitted from the pinion PG to the rack teeth RG. At this time, there occurs inclination of the rack retainer 14 as shown in FIG. 5(b) before sliding of the retainer seat 16 and the protruding sliding surface RBa of the rack bar RB. The rack bar RB moves due to such retainer inclination. After that, the rack bar RB moves with sliding of the retainer seat 16 and the protruding sliding surface RBa.

Figure 6:
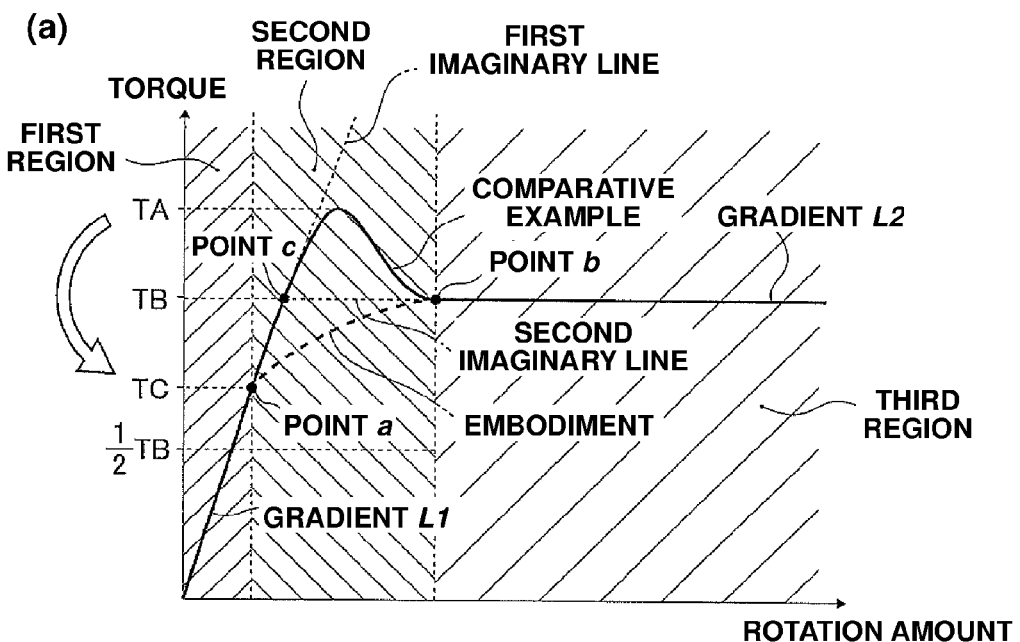
FIG. 6 is a diagram showing steering torque characteristics of the rack-and-pinion mechanism.
Figure 6:
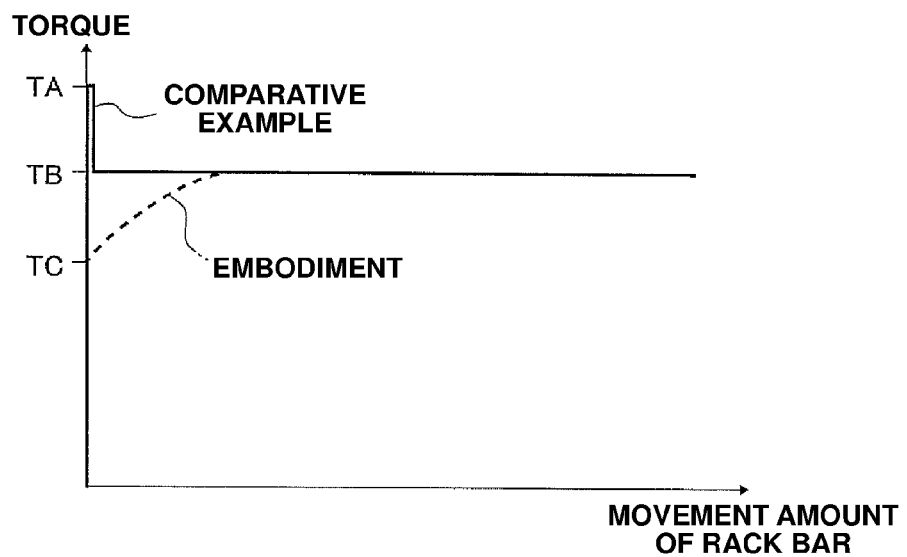

The following explanation will be given of the operating actions of the first embodiment in comparison to those of a comparative example. FIG. 6 is a diagram showing the steering torque characteristics of the rack-and-pinion mechanism, in which FIG. 6(a) shows a two-dimensional coordinate system with the rotation amount of the steering wheel SW plotted on the horizontal axis and the steering torque plotted on the vertical axis; and FIG. 6(b) shows a two-dimensional coordinate system with the movement amount of the rack bar plotted on the horizontal axis and the steering torque plotted on the vertical axis. In the figure, the characteristics of the comparative example are indicated by solid lines; and the characteristics of the first embodiment are indicated by dotted lines. Herein, the characteristics of the comparative example are those of a rack-and-pinion mechanism conventionally used in a vehicle.

In the comparative example, the set load of the coil spring 11 is high. Because of such high set load, there is less likely to occur inclination of the rack retainer 14; and the static frictional force between the retainer seat 16 and the protruding sliding surface RBa is large. When the rotation amount of the steering wheel SW starts increasing, the steering torque increases to a predetermined torque value TA by torsion of the torsion bar TB as shown in FIG. 6(b). As the frictional force between the retainer seat 16 and the protruding sliding surface RB changes from the static to dynamic frictional force due to inclination of the rack retainer 14 etc., the steering torque decreases from the predetermined torque value TA to a smaller predetermined torque value TB. After that, the rack bar RB starts moving. As a result, there occurs an overshoot of the steering torque as indicated by the solid lines in FIGS. 6(a) and 6(b) before the start of movement of the rack bar RB. It cannot be thus said that steering feeling is good.

Accordingly, the set load of the coil spring 11 is adjusted as indicated by the dotted line in FIG. 6(a) in the first embodiment. More specifically, the characteristics of the coil springs are set as follows. In the two-dimensional coordinate system, a region where the torsion amount of the torsion bar TB increases in response to rotation of the steering wheel SW without causing rotation of the pinion PG and axial movement of the rack bar RB is assumed as a first region. A gradient of increase of the steering torque relative to the rotation amount of the steering wheel SW in the first region is assumed as a gradient L1. A region where the rack retainer 14 swings (see FIG. 5(b)) in response to rotation of the steering wheel SW to thereby cause axial movement of the rack bar (corresponding to "apparent stroke"; see FIG. 5(b)) without sliding of the rack retainer 14 and the rack bar RB is assumed as a second region. A region where, in response to rotation of the steering wheel SW, there occurs axial movement of the rack bar RB with sliding of the rack retainer 14 and the rack bar RB is assumed as a third region. A gradient of increase of the steering torque relative to the rotation amount of the steering wheel SW in the third region is assumed as a gradient L2.

A boundary between the first and second regions is assumed as a boundary point a. A boundary between the second and third regions is assumed as a boundary point b. A point at which a first imaginary line drawn along the gradient L1 from the boundary point a to an area where the rotation amount of the steering wheel SW is larger than at the boundary point a intersects a second imaginary line drawn along the gradient L2 from the boundary point b to an area where the rotation amount of the steering wheel SW is smaller than at the boundary point b is assumed as a boundary point c.

The set load and spring constant of the coil spring 11, that is, the biasing force of the coil spring 11 by which the rack retainer 14 is biased toward the rack bar RB are adjusted such that, in the two-axis coordinate system, the boundary point a lies in a range where the rotation amount of the steering wheel SW and the steering torque are smaller than those at the boundary point c, and the boundary point b lies in a range where the rotation amount of the steering wheel SW is larger than that at the boundary point c.

In other words, the characteristics of the coil spring 11 are set such that, at the time when the rotation amount of the steering wheel SW increases, there does not develop a larger steering torque before the start of sliding of the rack retainer 14 and the protruding sliding surface RBa of the rack bar RB than that exerted at the start of sliding of the rack retainer 14 and the protruding sliding surface RBa. The inclination of the rack retainer 14 is induced from a predetermined torque value TC, which is smaller than the steering torque TB exerted at the start of sliding, so as to thereby cause an apparent stroke. Then, the sliding of the rack retainer 14 and the protruding sliding surface RBa smoothly starts after the inclination of the rack retainer 14 occurs as shown in FIG.

5(*b*). It is thus possible to ensure smooth movement of the steering wheel SW at the start of steering operation.

The coil spring is also set such that the boundary point b lies in the larger steering angle range than the boundary point c. It is thus possible to smoothen the steering torque characteristics relative to the rotation amount of the steering wheel SW. By these settings, the electric power steering apparatus is able to achieve improved steering feeling.

Furthermore, the assist torque application start timing of the electric power steering apparatus EPS is set to a predetermined rotation amount point larger than the rotation amount of the steering wheel at the boundary point b. When the assist torque is applied at the timing where the static frictional force is exerted before the start of relative rotation of the rack retainer 14 and the rack bar RB, the driver may feel discomfort in steering at the time of change from the static to dynamic frictional force by relative movement of the rack retainer 14 and the rack bar RB. The assist torque is hence applied by the electric motor 3 in the third region where the dynamic frictional force is exerted. It is thus possible to stabilize steering feeling during the application of the assist torque.

The predetermined torque value TC before the start of inclination of the rack retainer 14 is herein set greater than a half of the steering torque TB. It is thus possible to provide rigidity for steering feeling by preventing the rotation amount of the steering wheel before reaching the steering torque TB from becoming too large.

Figure 7:
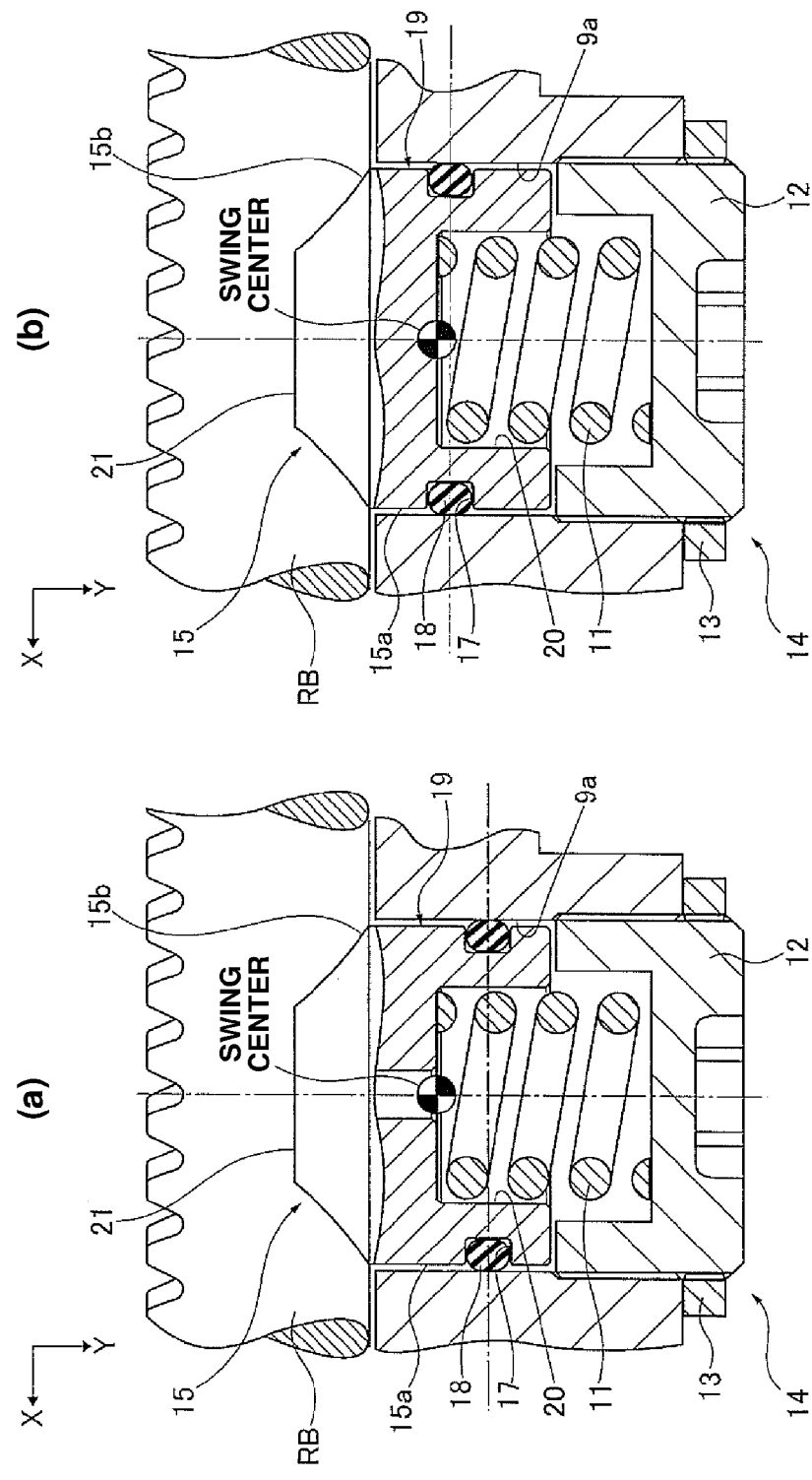
FIG. 7 is a schematic view showing a relationship between an O-ring and a swing center of the rack retainer.

The other configurations for effectively attaining the above operating actions will be explained below. FIG. 7 is a schematic view showing a relationship between the O-ring and the swing center of the rack retainer, in which FIG. 7(*a*) shows the comparative example where the O-ring is set downward of the swing center in the y-axis direction; and FIG. 7(*b*) shows the first embodiment where the swing center is set within the y-axis direction range of the seal ring groove 17 in which the O-ring 18 is fitted.

In the comparative example, the O-ring 18 is set downward of the swing center in the y-axis direction. When the rack retainer 14 swings in a clockwise direction in FIG. 7(*a*), for example, a left-side outer circumferential edge of the O-ring 18 interferes with the accommodating part inner wall 9*a*. Even in such a state, the rack retainer can swing because of the presence of a clearance between a right-side outer circumferential edge of the O-ring 18 and the accommodating part inner wall 9*a*. For further swing movement of the rack retainer, however, the rack retainer 14 has to be pushed downward in the y-axis direction against the biasing force of the coil spring 11. This leads to an increase of the biasing force of the coil spring 11 and an increase of the frictional force between the rack retainer 14 and the rack bar RB. Moreover, the rack retainer has to swing while overcoming the strong biasing force of the coil spring 11. It is consequently not possible to ensure stable swing of the rack retainer.

In first embodiment, by contrast, the swing center is set so as to overlap the seal ring groove 17 in the y-axis direction, that is, the biasing direction of the coil spring. In addition, the rack retainer 14 is arranged so as not to interfere with the rack retainer accommodating part 9 even when swinging in the first embodiment. It is thus possible to prevent the outer circumferential edge of O-ring 18 from excessively interfering with the accommodating part inner wall 9*a* during swing of the rack retainer 14. For example, when the rack retainer 14 swings in a clockwise direction in FIG. 7(*b*), the right side of the coil spring 11 is pushed downward; and simultaneously, the left side of the coil spring 11 is pushed upward by the coil spring 11. The biasing force 11 of the coil spring 11 is prevented from increasing by the swing of the rack retainer. It is namely possible to suppress increase of the set load of the coil spring 11 and allow smooth swing of the rack retainer.

Effects of First Embodiment

The effects of the present invention derived from the first embodiment will be mentioned below.

(1-1) The electric power steering apparatus comprises:
the steering unit including: the pinion shaft PS (as a steering shaft) rotatable in response to steering operation of the steering wheel SW; the pinion PG provided on the pinion shaft PS; and the rack bar RB having the rack teeth RG brought into engagement with the pinion PG so as to convert rotation of the pinion PG to axial movement;
the torsion bar TB disposed on the pinion shaft PS;
the rack housing RHS (as a housing member) having: the pinion accommodating part 8 that accommodates therein the pinion PG; the rack bar accommodating part 7 that accommodates therein the rack bar RB; and the rack retainer accommodating part 9 formed on the side opposite from the pinion accommodating part 8 with respect to the rack bar RB;
the rack retainer 14 supported within the rack retainer accommodating part 9 so as to be swingable in the longitudinal direction of the rack bar RB;
the electric motor 3 arranged to apply the steering force to the steering unit according to the steering torque, which is determined based on the torsion amount of the torsion bar TB and the spring constant of the torsion bar TB; and
the coil spring 11 (as a biasing member) arranged to bias the rack retainer 14 toward the rack bar RB such that, in the two-dimensional coordinate system in which: the horizontal axis represents the rotation amount of the steering wheel SW; the vertical axis represents the steering torque; the region where the torsion amount of the torsion bar TB increases in response to rotation of the steering wheel SW without causing rotation of the pinion PG and axial movement of the rack bar RB is assumed as the first region; the gradient of increase of the steering torque relative to the rotation amount of the steering wheel SW in the first region is assumed as the gradient L1; the region where the rack retainer 14 swings in response to rotation of the steering wheel SW to thereby cause axial movement of the rack bar RB without sliding of the rack retainer 14 and the rack bar RB is assumed as the second region; the region where, in response to rotation of the steering wheel SW, there occurs axial movement of the rack bar RB with sliding of the rack retainer 14 and the rack bar RB is assumed as the third region; the gradient of increase of the steering torque relative to the rotation amount of the steering wheel SW in the third region is assumed as the gradient L2; the boundary between the first and second regions is assumed as the boundary point a; the boundary between the second and third regions is assumed as the boundary point b; and the intersection of the first imaginary line drawn along the gradient L1 from the boundary point a to the area where the rotation amount of the steering wheel SW is larger than at the boundary point a and the second imaginary line drawn along the gradient L2 from the boundary point b to the area where the rotation amount of the steering wheel SW is smaller than at the boundary point b is assumed as the boundary point c, the boundary point a lies in the range where the rotation amount of the steering wheel SW and the steering torque are smaller than those at the boundary point c, and the boundary point b lies in the range where the rotation amount of the steering wheel SW is larger than that at the boundary point c.

As the set load of the coil spring is adjusted small such that the boundary point a lies in the range where the rotation amount of the steering wheel is smaller, it is possible to ensure smooth movement of the steering wheel at the start of steering operation. Further, it is possible to obtain the smooth steering torque characteristics relative to the steering angle as the coil spring is set such that the boundary point b lies in the range where the rotation amount of the steering wheel is larger than at the boundary point c. The electric power steering apparatus is therefore able to achieve improved steering feeling.

(2-2) The electric power steering apparatus according to the above (1-1), wherein the rack retainer 14 includes: the retainer body part 15 having a substantially circular outer shape when viewed in cross section perpendicular to the biasing direction of the coil spring 11; the retainer seat 16 (as a rack bar contact part) located closer to the rack bar RB than the retainer body part 15 so as to be brought into contact with the rack bar RB; the biasing member accommodating recess 20 opening at the side of the retainer body part opposite from the retainer seat 16; the annular seal ring groove 17 formed in the outer circumferential surface of the retainer body part 15 and having a substantially circular annular shape when viewed in cross section perpendicular to the biasing direction of the coil spring 11; and the O-ring 18 made of an elastic material and arranged in the seal ring groove 17 so as to support the rack retainer 14 within the rack retainer accommodating part 9 swingably in the longitudinal direction of the rack bar RB; and wherein the biasing member accommodating recess 20 is formed such that the bottom 21 of the biasing member accommodating recess 20 overlaps the seal ring groove 17 in the biasing direction of the coil spring 11.

It is possible to suppress increase of the set load of the coil spring 11 relative to the inclination of the rack retainer 14 and allow smooth swing of the rack retainer 14 by arranging the seal ring groove 17, that is, the center of swing of the rack retainer 14 on the O-ring 18, and the bottom 21 of the biasing member accommodating recess 20, that is, the center of swing of the rack retainer 14 on the tip end of the coil spring 11 so as to overlap each other.

(3-7) The electric power steering apparatus according to the above (2-2), wherein the single O-ring 18 is provided on the rack retainer 14.

In this configuration, it is possible to ease swing of the rack retainer 14 and ensure smooth movement of the steering wheel SW at the start of steering operation.

(4-8) The electric power steering apparatus according to the above (1-1), wherein the retainer seat 16 includes: the support surface 161 formed on the rack bar-side end portion of the retainer body part 15 and having a circular arc shape so as to extend along the outer circumferential surface of the rack bar RB; a pair of protruding portions, i.e., the first protruding portion 162 having its circumferential width gradually decreasing toward one circumferential end of the support surface 161 and the second protruding portion 163 having its circumferential width gradually decreasing toward the other circumferential end of the support surface 161; and the chamfered portion 16a provided on the edge portion of the support surface 161 for contact with the rack bar RB.

As compared to the case where the support surface has an edge portion remaining with no chamfered portion 16a, it is possible by forming the chamfered portion 16a to suppress catching of the rack retainer 14 on the edge portion.

(5-9) The electric power steering apparatus according to the above (1-1), wherein the coil spring is set such that the value of the steering torque at the boundary point a is greater than the half of the value of the steering torque at the boundary point c.

In this configuration, the rotation amount of the steering wheel SW at the boundary point b is prevented from becoming too large. It is thus possible to provide rigidity for steering feeling.

(6-10) The electric power steering apparatus according to the above (1-1), wherein the coil spring is set such that the rotation amount of the steering wheel SW at the boundary point b is smaller than the rotation amount of the steering wheel SW before the start of application of the assist torque by the electric motor 3.

In this configuration, the assist torque is applied by the electric motor 3 in the third region where the dynamic frictional force is exerted on the rack retainer 14. It is thus possible to stabilize steering feeling during the application of the assist torque.

(7-11) The electric power steering apparatus according to the above (1-1), wherein the steering apparatus comprises a reduction gear unit located closer to the pinion PG than the torsion bar TB; and wherein the electric motor 3 applies the steering force to the steering unit through the reduction gear unit.

In this case, the power steering apparatus is configured as the so-called single pinion assist type power steering apparatus. The load on the pinion PG of the single pinion assist type power steering apparatus is higher than that of a dual pinion assist type power steering apparatus. It is possible to more effectively improve steering feeling by applying the present invention to the power steering apparatus of the type subjected to severe friction conditions.

(8-14) The electric power steering apparatus according to the above (1-1), wherein the rack retainer 14 is arranged so as not to interfere with the rack retainer accommodating part 9 in a state where the rack retainer 14 swings by a maximum amount along the longitudinal direction of the rack bar RB.

By arranging the rack retainer 14 and the rack retainer accommodating room 9 so as not to interfere with each other, it is possible to suppress catching of the rack retainer 14 due to such interference.

Second Embodiment

Figure 8:
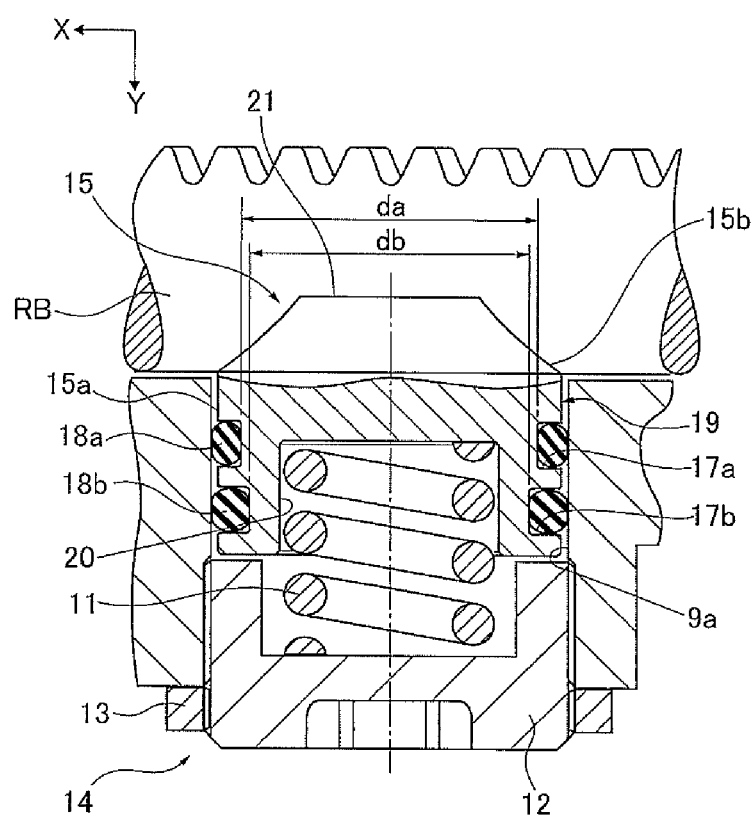
FIG. 8 is a cross-sectional view of a rack-and-pinion mechanism and its surrounding of an electric power steering apparatus according to a second embodiment of the present invention.

Next, a second embodiment of the present invention will be explained below. FIG. 8 is a cross-sectional view of a rack-and-pinion mechanism and its surrounding of an electric power steering apparatus according to the second embodiment of the present invention. The second embodiment is different from the first embodiment in that two O-rings are provided on the rack retainer in the second embodiment whereas only one O-ring 18 is provided on the rack retainer 14 in the first embodiment. More specifically, the rack retainer 14 includes: an annular first seal ring groove 17a formed in the outer circumferential surface of the retainer body part 15 at the same position as in the first embodiment and having a substantially circular annular shape when viewed in cross section perpendicular to the biasing direction of the coil spring 11; a first O-ring 18a made of an elastic material and arranged in the first seal ring groove 17a; a second seal ring groove 17b formed in the outer circumferential surface of the retainer body part at a position farther away from the retainer seat 16 than the first seal ring groove 17a; and a second O-ring 18b made of an elastic material and arranged in the second seal ring groove 17b.

A groove depth of the first seal ring groove 17a, which corresponds to a distance from the outer circumferential surface of the retainer body part 15 to a bottom surface of the first seal ring groove 17a, is set smaller than a groove depth of the second seal ring groove 17b. The first O-ring 18a and the second O-ring 18b are formed in the same shape. The biasing force of the first O-ring 18a is thus set stronger than the biasing force of the second O-ring 18b. In other words, a diameter da of the bottom surface of the first seal ring groove 17a is made larger than a diameter db of the bottom surface of the second seal ring groove 17b.

By arranging these two O-rings, it is possible to prevent excessive inclination of the rack retainer 14. It is further possible to stabilize the rack retainer 14, while ensuring swing of the rack retainer 14, by setting the biasing force of the first O-ring 18a stronger than the biasing force of the second O-ring 18b.

As explained above, the following effects are obtained in the second embodiment.

(9-3) The electric power steering apparatus,
wherein the rack retainer 14 includes: the annular second seal ring groove 17b formed in the outer circumferential surface of the retainer body part 15, at a position farther away from the retainer seat 16 than the first seal ring groove 17a in which the first O-ring 18a is arranged, and having a substantially circular annular shape when viewed in cross section perpendicular to the biasing direction of the coil spring 11; and the second O-ring 18b made of an elastic material and arranged in the second seal ring groove 17b.

In this configuration, it is possible to prevent excessive inclination of the rack retainer 14.

(10-4) The electric power steering apparatus according to the above (9-3),
wherein the biasing force of the first O-ring 18a is set stronger than the biasing force of the second O-ring 18b.

In this configuration, it is possible to stabilize the rack retainer 14 while ensuring swing of the rack retainer 14.

(11-5) The electric power steering apparatus according to the above (10-4),
wherein the groove depth of the first seal ring groove 17a from the outer circumferential surface of the retainer body part 15 to the bottom surface of the first seal ring groove 17a is set smaller than that of the second seal ring groove 17b; and
wherein the first O-ring 18a and the second O-ring 18b are formed in the same shape.

In this case, it is possible to achieve cost reduction and assembling improvement by commonality of the O-rings and, at the same time, vary the set loads of the respective O-rings by changing the depths of the seal ring grooves.

Other Embodiments

Although the present invention has been described above with reference to the first and second embodiments, it is feasible to adopt any other configuration or configurations in the present invention. For example, the following configurations are conceivable.

In the second embodiment, the set loads of the first and second O-rings 18a and 18b are varied by changing the groove depths of the first and second seal ring grooves 17a and 17b. Alternatively, the set loads of the first and second O-rings may be varied by setting the first and second O-rings at different compression ratios while setting both of the first and second seal ring grooves to the same depth.

Although the present invention is embodied as the single pinion-assist type electric power steering apparatus in each of the first and second embodiments, the present invention is also applicable to a dual pinion-assist type electric power steering apparatus in which another rack-and-pinion mechanism is additionally provided at a position apart from that of the above embodiment in the longitudinal direction of the rack bar RB. It is preferable in this case that, in a state where the electric motor is connected to the steering unit via the second pinion and the motor-side rack teeth, the coil spring 11 is set such that, in the two-dimensional coordinate system, the boundary point a lies in the range where the rotation amount of the steering wheel and the steering torque are smaller than those at the boundary point c, and the boundary point b lies in the range where the rotation amount of the steering wheel is larger than that at the boundary point c. The torque sensor TS is disposed between the steering wheel SW and the pinion PG rather than on the side of the second pinion connected to the electric motor. The assist torque is not applied until the rotation amount of the steering wheel SW reaches the predetermined rotation amount. In response to rotation of the steering wheel SW, the rack bar RB moves to pull the reduction gear unit and the electric motor on the side of the second pinion. Even in such an electric power steering apparatus, it is possible to avoid an overshoot of the steering torque and obtain good steering feeling.

The technical ideas derived from the above other embodiments of the present invention will be mentioned below.

(12-6) The electric power steering apparatus,
wherein the groove depth of the first seal ring groove from the outer circumferential surface of the retainer body part to the bottom surface of the first seal ring groove is the same as that of the second seal ring groove; and
wherein the compression ratio of the first O-ring in a state of being accommodated together with the rack retainer in the rack retainer accommodating part is set higher than that of the second O-ring.

It is possible to adjust the set loads of the O-rings by, while setting the ring grooves to the same depth, changing the thicknesses, materials etc. of the O-rings and thereby varying the compression ratios of the O-rings.

(13-2) The electric power steering apparatus,
wherein the rack bar has the motor-side rack teeth formed at a position apart from the rack teeth in the longitudinal direction of the rack bar;
wherein the steering unit includes the second pinion brought into engagement with the motor-side rack teeth; and wherein the electric motor applies the steering force to the steering unit through the motor-side rack teeth and the second pinion.

The electric power steering apparatus, even of the so-called dual pinion-assist type, is able to achieve improved steering feeling. As mentioned above, it is possible to ensure smooth movement of the steering wheel at the start of steering operation by adjusting the set load of the coil spring 11 small such that the boundary point a lies in the range where the rotation amount of the steering wheel is smaller. Further, it is possible to ensure the smooth steering torque characteristics relative to the steering angle by setting the coil spring such that the boundary point b lies in the range where the rotation amount of the steering wheel is larger than at the boundary point c. The steering feeling is improved by these settings.

(14-13) The electric power steering apparatus,
wherein the biasing member is set such that, in the two-dimensional coordinate system, the boundary point a lies in the range where the rotation amount of the steering wheel and the steering torque are smaller than those at the boundary point c, and the boundary point b lies in the range where the rotation amount of the steering wheel is larger than that at the boundary point c, in the state where the electric motor is connected to the steering unit via the second pinion and the motor-side rack teeth.

In this configuration, it is possible to obtain the effects of the above (13-12) for improvement of steering feeling even in the state where the reduction gear unit and the electric motor on the side of the second pinion are pulled by the rack bar.

Based on the above embodiments, the present invention can be implemented by, for example, the following aspects.

An electronic power steering apparatus according to one aspect of the present invention comprises:
a steering unit including a steering shaft rotatable in response to steering operation of a steering wheel, a pinion provided on the steering shaft, and a rack bar having rack teeth brought into engagement with the pinion so as to convert rotation of the pinion PG to axial movement;
a torsion bar disposed on the steering shaft;
a housing member having a pinion accommodating part that accommodates therein the pinion, a rack bar accommodating part that accommodates therein the rack bar, and a rack retainer accommodating part formed on a side opposite from the pinion accommodating part with respect to the rack bar;
a rack retainer supported within the rack retainer accommodating part so as to be swingable in a longitudinal direction of the rack bar;
an electric motor arranged to apply a steering force to the steering unit according to a steering torque which is determined based on a torsion amount of the torsion bar and a spring constant of the torsion bar; and
a biasing member arranged to bias the rack retainer toward the rack bar such that,
in a two-dimensional coordinate system in which: a horizontal axis represents a rotation amount of the steering wheel; a vertical axis represents the steering torque; a region where the torsion amount of the torsion bar increases in response to rotation of the steering wheel without causing rotation of the pinion and axial movement of the rack bar is assumed as a first region; a gradient of increase of the steering torque relative to the rotation amount of the steering wheel in the first region is assumed as $L1$; a region where the rack retainer swings in response to rotation of the steering wheel to thereby cause axial movement of the rack bar without sliding of the rack retainer and the rack bar is assumed as a second region; a region where there occurs axial movement of the rack bar, with sliding of the rack retainer and the rack bar, in response to rotation of the steering wheel is assumed as a third region; a gradient of increase of the steering torque relative to the rotation amount of the steering wheel in the third region is assumed as $L2$; a boundary between the first region and the second region is assumed as a boundary point a; a boundary between the second region and the third region is assumed as a boundary point b; and an intersection of a first imaginary line drawn along the gradient $L1$ from the boundary point a to an area where the rotation amount of the steering wheel is larger than at the boundary point a and a second imaginary line drawn along the gradient $L2$ from the boundary point b to an area where the rotation amount of the steering wheel is smaller than at the boundary point b is assumed as a boundary point c,
the boundary point a lies in a range where the rotation amount of the steering wheel and the steering torque are smaller than those at the boundary point c, and the boundary point b lies in a range where the rotation amount of the steering wheel is larger than that at the boundary point c.

In a preferred aspect of the present invention, the electric power steering apparatus is provided, wherein the rack retainer includes: a retainer body part having a substantially circular outer shape when viewed in cross section perpendicular to a biasing direction of the biasing member; a rack bar contact part located closer to the rack bar than the retainer body part so as to be brought into contact with the rack bar; a biasing member accommodating recess opening at a side of the retainer body part opposite from the retainer seat; an annular seal ring groove formed in an outer circumferential surface of the retainer body part and having a substantially circular annular shape when viewed in cross section perpendicular to the biasing direction of the biasing member; and an O-ring made of an elastic material and arranged in the seal ring groove so as to support the rack retainer within the rack retainer accommodating part swingably in the longitudinal direction of the rack bar; and wherein the biasing member accommodating recess is formed such that a bottom of the biasing member accommodating recess overlaps the seal ring groove in the biasing direction of the biasing member.

In still another preferred aspect of the present invention, the electric power steering apparatus is provided, wherein the rack retainer further includes: an annular second seal ring groove formed in the outer circumferential surface of the retainer body part, at a position farther away from the rack bar contact part than the seal ring groove, and having a substantially circular annular shape when viewed in cross section perpendicular to the biasing direction of the biasing member; and a second O-ring made of an elastic material and arranged in the second seal ring groove.

In still another preferred aspect of the present invention, the electric power steering apparatus is provided, wherein a biasing force of the O-ring is set stronger than a biasing force of the second O-ring.

In still another preferred aspect of the present invention, the electric power steering apparatus is provided, wherein a groove depth of the seal ring groove from the outer circumferential surface of the retainer body part to a bottom surface of the seal ring groove is set smaller than that of the second seal ring groove; and wherein the O-ring and the second O-ring are formed in the same shape.

In still another preferred aspect of the present invention, the electric power steering apparatus is provided, wherein a groove depth of the seal ring groove from the outer circumferential surface of the retainer body part to a bottom surface of the seal ring groove is the same as that of the second seal ring groove; and wherein a compression ratio of the O-ring in a state of being accommodated together with the rack retainer in the rack retainer accommodating part is set higher than that of the second O-ring.

In still another preferred aspect of the present invention, the electric power steering apparatus is provided, wherein the single O-ring is arranged on the rack retainer.

In still another preferred aspect of the present invention, the electric power steering apparatus is provided, wherein the rack bar contact part includes: a support surface formed on a rack bar-side end portion of the retainer body part and having a circular arc shape so as to extend along an outer circumferential surface of the rack bar; a pair of first and second protruding portions, the first protruding portion having a circumferential width gradually decreasing toward one circumferential end of the support surface, the second protruding portion having a circumferential width gradually decreasing toward the other circumferential end of the support surface; and a chamfered portion provided on an edge portion of the support surface for contact with the rack bar.

In still another preferred aspect of the present invention, the electric power steering apparatus is provided, wherein the biasing member is set such that a value of the steering torque at the boundary point a is greater than a half of a value of the steering torque at the boundary point c.

In still another preferred aspect of the present invention, the electric power steering apparatus is provided, wherein the biasing member is set such that the rotation amount of the steering wheel at the boundary point b is smaller than the rotation amount of the steering wheel before the start of application of the steering force by the electric motor.

In still another preferred aspect of the present invention, the electric power steering apparatus is provided, wherein the steering apparatus comprises a reduction gear unit located closer to the pinion than the torsion bar; and wherein the electric motor applies the steering force to the steering unit through the reduction gear unit.

In still another preferred aspect of the present invention, the electric power steering apparatus is provided, wherein the rack bar has motor-side rack teeth formed at a position apart from the rack teeth in the longitudinal direction of the rack bar; wherein the steering unit includes a second pinion brought into engagement with the motor-side rack teeth; and wherein the electric motor applies the steering force to the steering unit through the motor-side rack teeth and the second pinion.

In still another preferred aspect of the present invention, the electric power steering apparatus is provided, wherein the biasing member is set such that, in the two-dimensional coordinate system, the boundary point a lies in the range where the rotation amount of the steering wheel and the steering torque are smaller than those at the boundary point c, and the boundary point b lies in the range where the rotation amount of the steering wheel is larger than that at the boundary point c, in a state where the electric motor is connected to the steering unit via the second pinion and the motor-side rack teeth.

In still another preferred aspect of the present invention, the electric power steering apparatus is provided, wherein the rack retainer is arranged so as not to interfere with the rack retainer accommodating part in a state where the rack retainer swings by a maximum amount in the longitudinal direction of the rack bar.

The invention claimed is:
1. An electric power steering apparatus, comprising:
a steering unit including a steering shaft rotatable in response to steering operation of a steering wheel, a pinion provided on the steering shaft, and a rack bar having rack teeth brought into engagement with the pinion so as to convert rotation of the pinion PG to axial movement;
a torsion bar disposed on the steering shaft;
a housing member having a pinion accommodating part that accommodates therein the pinion, a rack bar accommodating part that accommodates therein the rack bar, and a rack retainer accommodating part formed on a side opposite from the pinion accommodating part with respect to the rack bar;
a rack retainer supported within the rack retainer accommodating part so as to be swingable in a longitudinal direction of the rack bar;
an electric motor arranged to apply a steering force to the steering unit according to a steering torque which is determined based on a torsion amount of the torsion bar and a spring constant of the torsion bar; and
a biasing member arranged to bias the rack retainer toward the rack bar such that,
in a two-dimensional coordinate system: in which a horizontal axis represents a rotation amount of the steering wheel; a vertical axis represents the steering torque; a region where the torsion amount of the torsion bar increases in response to rotation of the steering wheel without causing rotation of the pinion and axial movement of the rack bar is a first region; a gradient of increase of the steering torque relative to the rotation amount of the steering wheel in the first region is a gradient L1; a region where the rack retainer swings in response to rotation of the steering wheel to thereby cause axial movement of the rack bar without sliding of the rack retainer and the rack bar is a second region; a region where there occurs axial movement of the rack bar, with sliding of the rack retainer and the rack bar, in response to rotation of the steering wheel is a third region; a gradient of increase of the steering torque relative to the rotation amount of the steering wheel in the third region is a gradient L2; a boundary between the first region and the second region is a boundary point a; a boundary between the second region and the third region is a boundary point b; and an intersection of a first imaginary line drawn along the gradient L1 from the boundary point a to an area where the rotation amount of the steering wheel is larger than at the boundary point a and a second imaginary line drawn along the gradient L2 from the boundary point b to an area where the rotation amount of the steering wheel is smaller than at the boundary point b is a boundary point c,
the boundary point a lies in a range where the rotation amount of the steering wheel and the steering torque are smaller than those at the boundary point c, and the boundary point b lies in a range where the rotation amount of the steering wheel is larger than that at the boundary point c.

2. The electric power steering apparatus according to claim 1,
wherein the rack retainer includes: a retainer body part having a substantially circular outer shape when viewed in cross section perpendicular to a biasing direction of the biasing member; a rack bar contact part located closer to the rack bar than the retainer body part so as to be brought into contact with the rack bar; a biasing member accommodating recess opening at a side of the retainer body part opposite from the rack bar contact part; an annular seal ring groove formed in an outer circumferential surface of the retainer body part and having a substantially circular annular shape when viewed in cross section perpendicular to the biasing direction of the biasing member; and an O-ring made of an elastic material and arranged in the seal ring groove so as to support the rack retainer within the rack retainer accommodating part swingably in the longitudinal direction of the rack bar; and
wherein the biasing member accommodating recess is formed such that a bottom of the biasing member accommodating recess overlaps the seal ring groove in the biasing direction of the biasing member.

3. The electric power steering apparatus according to claim 2,
wherein the rack retainer further includes: an annular second seal ring groove formed in the outer circumferential surface of the retainer body part, at a position farther away from the rack bar contact part than the seal ring groove, and having a substantially circular annular shape when viewed in cross section perpendicular to the biasing direction of the biasing member; and a second O-ring made of an elastic material and arranged in the second seal ring groove.

4. The electric power steering apparatus according to claim 3,
wherein a biasing force of the O-ring is set stronger than a biasing force of the second O-ring.

5. The electric power steering apparatus according to claim 4,
wherein a groove depth of the seal ring groove from the outer circumferential surface of the retainer body part to a bottom surface of the seal ring groove is set smaller than that of the second seal ring groove; and
wherein the O-ring and the second O-ring are formed in the same shape.

6. The electric power steering apparatus according to claim 4,
wherein a groove depth of the seal ring groove from the outer circumferential surface of the retainer body part to a bottom surface of the seal ring groove is the same as that of the second seal ring groove; and
wherein a compression ratio of the O-ring in a state of being accommodated together with the rack retainer in the rack retainer accommodating part is set higher than that of the second O-ring.

7. The electric power steering apparatus according to claim 2,
wherein the single O-ring is provided on the rack retainer.

8. The electric power steering apparatus according to claim 2,
wherein the rack bar contact part includes: a support surface formed on a rack bar-side end portion of the retainer body part and having a circular arc shape so as to extend along an outer circumferential surface of the rack bar; a pair of first and second protruding portions, the first protruding portion having a circumferential width gradually decreasing toward one circumferential end of the support surface, the second protruding portion having a circumferential width gradually decreasing toward the other circumferential end of the support surface; and a chamfered portion provided on an edge portion of the support surface for contact with the rack bar.

9. The electric power steering apparatus according to claim 1,
wherein the biasing member is set such that a value of the steering torque at the boundary point a is greater than a half of a value of the steering torque at the boundary point c.

10. The electric power steering apparatus according to claim 1,
wherein the biasing member is set such that the rotation amount of the steering wheel at the boundary point b is smaller than the rotation amount of the steering wheel before the start of application of the steering force by the electric motor.

11. The electric power steering apparatus according to claim 1,
wherein the steering apparatus comprises a reduction gear unit located closer to the pinion than the torsion bar; and
wherein the electric motor applies the steering force to the steering unit through the reduction gear unit.

12. The electric power steering apparatus according to claim 1,
wherein the rack bar has motor-side rack teeth formed at a position apart from the rack teeth in the longitudinal direction of the rack bar;
wherein the steering unit includes a second pinion brought into engagement with the motor-side rack teeth; and
wherein the electric motor applies the steering force to the steering unit through the motor-side rack teeth and the second pinion.

13. The electric power steering apparatus according to claim 12,
wherein the biasing member is set such that, in the two-dimensional coordinate system, the boundary point a lies in the range where the rotation amount of the steering wheel and the steering torque are smaller than those at the boundary point c, and the boundary point b lies in the range where the rotation amount of the steering wheel is larger than that at the boundary point c, in a state where the electric motor is connected to the steering unit via the second pinion and the motor-side rack teeth.

14. The electric power steering apparatus according to claim 1,
wherein the rack retainer is arranged so as not to interfere with the rack retainer accommodating part in a state where the rack retainer swings by a maximum amount in the longitudinal direction of the rack bar.

* * * * *